(12) United States Patent
Van Erden et al.

(10) Patent No.: US 7,544,318 B2
(45) Date of Patent: Jun. 9, 2009

(54) METHOD AND APPARATUS FOR PRODUCING ORIENTED PLASTIC STRAP

(75) Inventors: Donald L. Van Erden, Wildwood, IL (US); James M. Kniola, Arlington Heights, IL (US); Kenneth C. Rinehart, Cary, IL (US); Otto G. Weber, Arlington Heights, IL (US)

(73) Assignee: Illinois Tool Works Inc., Glenview, IL (US)

( * ) Notice: Subject to any disclaimer, the term of this patent is extended or adjusted under 35 U.S.C. 154(b) by 851 days.

(21) Appl. No.: 10/818,300

(22) Filed: Apr. 5, 2004

(65) Prior Publication Data

US 2005/0218552 A1 Oct. 6, 2005

(51) Int. Cl.
  *B29C 55/18* (2006.01)
  *B29C 59/04* (2006.01)
(52) U.S. Cl. ............... 264/175; 264/177.1; 264/320
(58) Field of Classification Search ............ 264/275
  See application file for complete search history.

(56) References Cited

U.S. PATENT DOCUMENTS

| | | | | |
|---|---|---|---|---|
| 3,619,460 A | * | 11/1971 | Chill | 264/288.4 |
| 4,408,974 A | * | 10/1983 | Comerio | 425/194 |
| 5,387,388 A | | 2/1995 | Van Erden et al. | |
| 5,405,699 A | | 4/1995 | Van Erden et al. | |
| 5,660,787 A | | 8/1997 | Van Erden et al. | |
| 5,688,536 A | | 11/1997 | Van Erden et al. | |
| 5,695,709 A | | 12/1997 | Van Erden et al. | |
| 5,837,349 A | | 11/1998 | Van Erden et al. | |

* cited by examiner

*Primary Examiner*—Monica A Huson
(74) *Attorney, Agent, or Firm*—Levenfeld Pearlstein, LLC

(57) ABSTRACT

A method of producing a plastic sheet-strap includes the steps of providing first and second work rollers such that the work rollers rotate in opposite directions and at different lineal surface velocities. The work rollers are spaced apart with respect to each other so as to define a work roller nip therebetween. A pinch roller is provided that is operably associated with the first work roller. The pinch roller and the first roller defining a deaerating nip therebetween. A solid sheet of material having a thickness is fed into the deaerating nip. The material is pinched against the first work roller and moves with rotation of the first work roller to the work roller nip between the first and second work rollers. The material is simultaneously milled and stretched substantially at the nip during a single pass of the solid sheet material through the nip as the rollers rotate in opposite directions and at different lineal surface velocities to form a milled and stretched oriented sheet. The second roller has a concave profile to work the edges of the sheet more than a central region of the sheet. A chill roller is disposed downstream of the second work roller to cool the milled and stretched oriented sheet.

16 Claims, 1 Drawing Sheet

METHOD AND APPARATUS FOR
PRODUCING ORIENTED PLASTIC STRAP

BACKGROUND OF THE INVENTION

The present invention is directed to a method and apparatus for producing oriented plastic strap. More particularly, the present invention is directed to a method and apparatus for milling and stretching a plastic sheet into strap stock material having a predetermined and consistent desired thickness.

Plastic strap is often used to package items in a bundle, on a pallet or in a crate for shipping, storage and merchandising. The strap is applied in a tensioned loop by an automatic or manually operated strapping machine. In a typical manufacturing process, a cast sheet of thermoplastic material, for example, polypropylene, is first reduced in size by rolling it through a pair of closely spaced milling rollers or cylinders that rotate in opposite directions. After the thickness of the sheet is reduced, the sheet is drawn and stretched out of the milling rollers by a series of orienting rollers or a bridle assembly to its final desired size.

One specific method that is commonly used is a process called the short gap method. An apparatus for carrying out this method includes an entry bridle, a stretching assembly and an exit bridle. A slow speed, heated bridle assembly advances a cast sheet of material, usually a film, to a stretching assembly. The stretching assembly includes a pair of rollers or cylinders set a distance apart. The first roller rotates at the same speed as the entry bridle. The second roller is rotating faster than the first roller and at the same speed as the exit bridle. Thus, as the film passes through the assembly, it is stretched to its final desired size.

Still another known method is called the zero gap method. In this method, the gap between the steps of milling and stretching are eliminated. Thus, the steps are carried out substantially simultaneously.

The zero gap method overcame many of the disadvantages of prior known methods, vis-à-vis limited increases in strength without significant decreases in other desired properties. In addition, the zero gap method reduced the necking that otherwise occurred as the sheet was stretched over the distance between the rollers.

It was however found that other concerns arose with use of the zero gap method. For example, it was noted that the lateral ends or sides of the sheet-strap tended to be thicker than the central sheet-strap regions. That is, there was less reduction in thickness or less flattening at the edges than in the middle or central region of the sheet-strap. Although the zero gap method in some respects addressed this problem by "pinning" the edges of the sheet-strap between the rollers, the lessened edge reduction nevertheless occurred.

In addition, it was noted that air tended to accumulate at the juncture of the strap or sheet and the roller. The accumulated or entrained air, which is generally "caught" by surface roughness or imperfections in the sheet-strap, moved within the apparatus, to between the sheet-strap and the milling rollers. This resulted in uneven thermal, e.g., heat transfer, properties across the lateral width of the roller/sheet interface.

It was also noted that in certain instances, the sheet-strap continued to be worked, e.g., elongated, even after it exited the last work roller. As a result, the amount of elongation of the sheet-strap (as during the working of the sheet-strap) was not as controlled as desired.

Accordingly, there is a need for an improved method for producing oriented strap. Such a method results in consistent strap thickness across the width of the strap. Desirably, in such a method, air accumulation at the first work roller is reduced or eliminated, resulting in consistent thermal and heat transfer properties at the strap/roller interface.

BRIEF SUMMARY OF THE INVENTION

An improved method of producing a plastic sheet-strap includes the steps of providing first and second work rollers such that the work rollers rotate in opposite directions and at different lineal surface velocities. The work rollers are spaced apart with respect to each other so as to define a work roller nip therebetween;

A pinch roller is operably associated with the first work roller. The pinch roller and the first roller define a deaerating nip therebetween. A solid sheet of material, having a thickness, is fed into the deaerating nip such that the solid sheet of material is pinched against the first work roller and moves with rotation of the first work roller to the work roller nip. Movement of the sheet into the nip between the first and second work rollers simultaneously mills and stretches the solid sheet of material substantially at the nip during a single pass of the solid sheet material through the nip as the rollers rotate in opposite directions and at different lineal surface velocities to form a milled and stretched oriented sheet.

The pinch roller can be formed having a convex surface to facilitate reducing the entrainment of air in the center of the sheet-strap. Alternately, the pinch roller can be formed having a concave surface to facilitate reforming the edges of the sheet-strap.

The deaerating nip formed by the pinch roller and the first work roller serves to flatten surface irregularities to prevent air from being entrained between the sheet and the work rollers. This has the effect of reducing thermal and heat transfer inconsistencies between the rollers and the sheet.

In a preferred method, the pinch roller is rotated at a speed to match the lineal surface velocity of the pinch roller with the lineal surface velocity of the first work roller. To effect preventing air entrainment, the sheet is compressed between the pinch roller and the first work roller. The pressure exerted by the pinch roller on the sheet-strap can be controlled by an air regulator (controlling a pneumatic cylinder), or like means.

The method can include milling and stretching the sheet between a flat first work roller and a concave-profile second work roller. This configuration "works" the edges of the sheet to a greater extent than the central region of the sheet. In addition, the method can include cooling the sheet immediately as its exits the milling and stretching operation, that is immediately downstream of exiting the second work roller. This prevents over-working or over-stretching the sheet. Cooling can be carried out by contact with a chill roller. An apparatus for carrying out the method is also disclosed.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

While the present invention is susceptible of embodiment in various forms, there is shown in the figures and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States patent Office, and does not imply, nor should be inferred to limit the subject matter disclosed herein.

Figure 1:
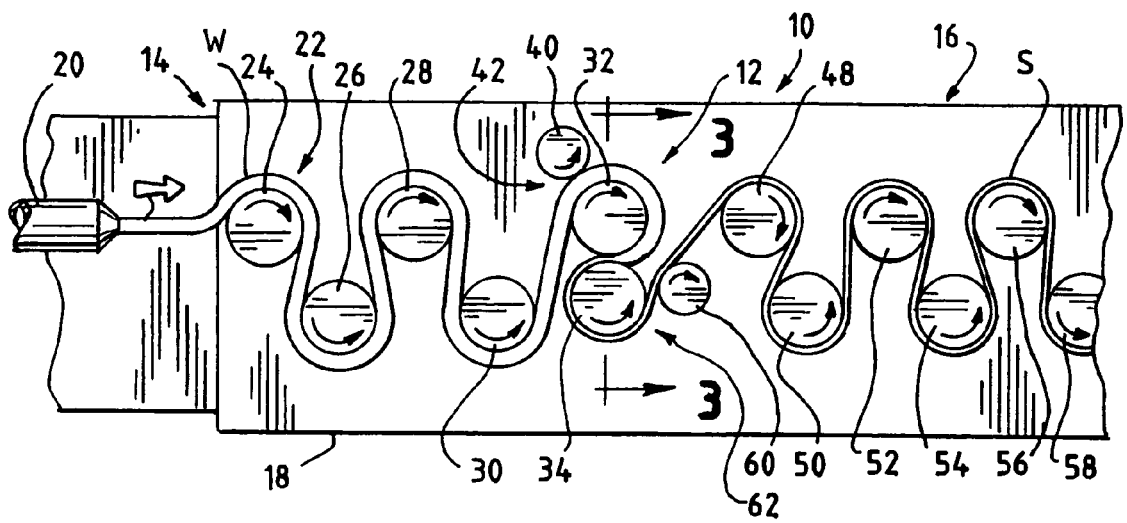
FIG. 1 is a simplified partial side view of an apparatus for producing an improved oriented strap in accordance with the principles of the present invention.
Figure 2:
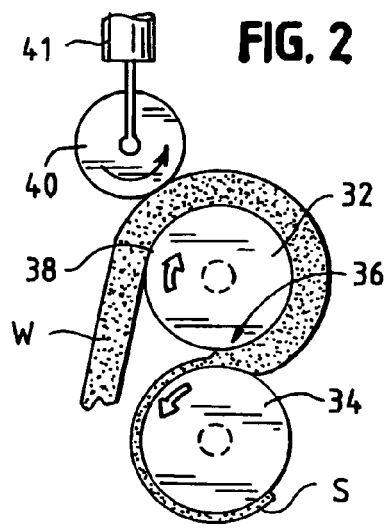
FIG. 2 is an enlarged side view of the milling and stretching rollers of the zero gap assembly and showing an inlet or upstream pinch roller and an exit or downstream chill roller.

Illustrated schematically in FIG. 1, is an apparatus 10 for milling and stretching or elongating a sheet or workpiece W into a thin strap stock material. The general arrangement and operation of such an apparatus 10 and method are described in Van Erden et al., U.S. Pat. No. 5,387,388, which is commonly assigned with the present application, and which is incorporated herein by reference.

Although the present invention is discussed with only a single sheet or workpiece W, it will be understood that more than one sheet or workpiece can be passed through the assembly at a time.

The illustrated apparatus 10 includes a zero gap assembly 12. The phrase "zero gap" refers to the concept of substantially eliminating any gap between a step of milling and a step of stretching a sheet or workpiece W. That is, the steps of milling and stretching are accomplished substantially simultaneously. The zero gap assembly 12 is located between a feeding assembly 14 and an exit bridle assembly 16 on a frame or support 18.

The feeding assembly 14 may take any of several forms, and as shown in FIG. 1, can include an extruder 20 for extruding a sheet or workpiece of stock material and an entry bridle assembly 22. The extruder 20 produces a sheet or workpiece of suitable material, such as polypropylene, to the entry bridle assembly 22 for feeding into the zero gap assembly 12. The sheet W can be pre-heated in the entry bridle assembly 22 to enhance the working properties of the sheet material.

The entry bridle 22 includes a plurality of rollers or cylinders 24, 26, 28, 30 that properly deliver the sheet W for feeding into the zero gap assembly 12. Typically, the rollers 24, 26, 28, 30 do not substantially contribute to the stretching or the milling of the sheet W. As illustrated, the rollers 24, 26, 28, 30 are arranged along two rows with bottom row rollers 26, 30 spaced between and at a distance beneath the top row rollers 24, 28. Rollers 24, 28 rotate in a clockwise direction while rollers 26, 30 rotate in a counterclockwise direction so that when the sheet W is wound around the entry bridle assembly 22, it travels through the rollers 24, 26, 28, 30. Each of the rollers 24, 26, 28, 30 are rotated at a uniform speed by, for example, a motor and shaft assembly (not shown). All of the rollers 24, 26, 28, 30 rotate at essentially the same speed or lineal surface velocity as a top roller 32 in the zero gap assembly 12.

After the sheet W passes through the feeding assembly 14, it advances to the zero gap assembly 12 for milling and stretching into a finished sheet S having a predetermined desired thickness. The zero gap assembly 12 includes first and second work rollers or cylinders 32, 34, respectively (illustrated as an upper or top roller 32 and a lower or bottom roller 34) that are rotatably mounted in opposing relationship. A nip 36, that is, the minimum distance between the work rollers 32, 34, can be varied greatly depending on the desired finished thickness of the sheet S. As discussed in detail in the aforementioned U.S. Pat. No. 5,387,388 to Van Erden et al., the zero gap rollers 32, 34 may be solid or hollow and may be heated to enhance the stretching properties of the sheet material.

It has been observed that air can be entrained or trapped by the moving sheet W as it approaches the top roller 32. Air tends to collect or accumulate along the surface of the sheet W and can accumulate within minor surface imperfections in the sheet W. Because of the "stretching" of the sheet W about the top roller 32, the air accumulates between the sheet W and the roller 32 as the sheet W moves over the roller 32. The trapped air tends to form a pocket that moves around between the sheet W and the roller 32 at the sheet/roller interface, as indicated at 38.

In that the air has considerably different heat transfer properties than the roller 32 and the sheet W, heat transfer from the roller 32 to the sheet W is adversely effected, i.e., inconsistent. This in turn results in varying temperatures in the sheet W (small temperature variations at various locations on the sheet W). These temperature variations can result in changes in thickness of the sheet S after orientation, in the direction of flow.

In order to prevent air from being entrained between the sheet W and the top roller 32, a high pressure pinch roller 40 is positioned at the inlet 42 to the zero gap assembly 12, just downstream of the point at which the sheet W begins to wrap around the top roller 32. In a present apparatus, the pinch roller 40 is configured to compress the sheet W, as much as $2/1000$ inches (2 mils) to flatten surface roughness of the sheet W to prevent air entrainment. An alternate pinch roller 240 (see FIG. 4b) can be formed with a convex surface to reduce the entrainment of air at the center of the sheet W.

In a present embodiment, the pinch roller 40 exerts a pressure on the sheet (against the top roller 32) by actuation of a cylinder 41, such as a pneumatic cylinder. The pressure can be controlled or varied to achieve a desired compression by control/variation of the pneumatic pressure. Other methods to achieve pressure pinch roller 40 control will be recognized by those skilled in the art.

It is also contemplated that the application of pressure by the pinch roller 40 can reform the shape of the sheet W before it is oriented. This can, in turn, flatten edge beads or tapers and provide a more uniform thickness (improved flatness) across the milled and stretched sheet S. The pinch roller 40, as seen in FIG. 1, rotates in a direction opposite of the first work roller 32.

Figure 4A:
FIGS. 4a and 4b illustrated alternate profiles for the pinch roller.
Figure 4B:
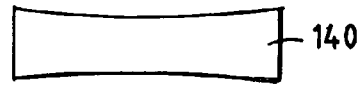
Figure 3:
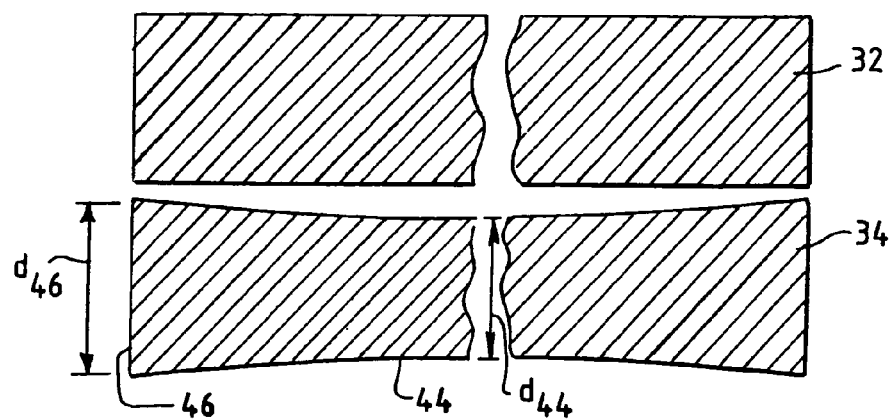
FIG. 3 is a partial cross-sectional view of the milling and stretching rollers of FIG. 1, taken along line 3-3 of FIG. 1.

It will also be appreciated by those skilled in the art that the work rollers 32, 34 principally "work" the edges of the sheet W, rather than the central region of the sheet W. To this end, the present apparatus 10 uses a concave bottom roller 34 in the zero gap assembly 12. As seen in FIG. 3, a present bottom roller 34 has a diameter $d_{44}$ at the middle 44 of the roller 34 that is about $10/1000$ inches (10 mils) to about 20 mils, and preferably about 14 mils to about 16 mils less than the diameter $d_{46}$ at the edges 46 of the roller 34. In this manner, the edges of the sheet S are flatter and the thickness of the sheet S across the sheet width is more consistent than that of sheet formed in flat roller assemblies. The concave surface of the roller 34 also allows air that may get past the pinch roller 40 to pass through the nip 36 rather than accumulate at the nip 36. Alternately still, as seen in FIG. 4a, the pinch roller 140 can have a concave surface to further "work" the edges of the sheet W.

After the finished sheet S exits the zero gap assembly 12, it winds around the exit bridle assembly 16. The illustrated exit bridle assembly 16 includes a plurality of rollers or cylinders 48, 50, 52, 54, 56, 58 that pull the sheet S out of the zero gap assembly 12 properly. The rollers 48, 50, 52, 54, 56, 58 do not substantially contribute to any stretching of the sheet S. It will however be appreciated by those skilled in the art that the rollers 48, 50, 52, 54, 56, 58 can add some stretch to the sheet W. As illustrated, the rollers 48, 50, 52, 54, 56, 58 are arranged along two rows with bottom row rollers 50, 54, 58 being spaced between and at a distance beneath the top row rollers 48, 52, 56. Rollers 48, 52, 56 rotate in a clockwise direction while rollers 50, 54, 58 rotate in a counterclockwise direction so that when the sheet S is wound around the exit bridle assembly 16, it travels through the rollers 48, 50, 52, 54, 56, 58. The rollers 48, 50, 52, 54, 56, 58 are rotated at a uniform speed by, for example, a motor and shaft assembly (not shown). All of the rollers 48, 50, 52, 54, 56, 58 rotate at essentially the same lineal surface velocity as the bottom roller 34 in the zero gap assembly 12.

Although the rollers 48, 50, 52, 54, 56, 58 do not substantially contribute to any stretching of the sheet S, the elevated temperature of the sheet S, in conjunction with the "pulling" tends to continue elongation of the sheet S. As a result, control of the final thickness of the sheet S (and thus the subsequently formed strap) may not be as great as desired. To this end, a chiller roller 60 is positioned proximal to the outlet 62 of the zero gap assembly 12, prior to entry into the exit bridle 16. The chiller roller 60 reduces the temperature of the sheet S which in turn reduces the extent of undesirable, post-milling elongation. This provides greater control over the final sheet S (and thus strap) thickness.

Although the embodiment shown and described herein, is configured having the mill (work) rollers 32, 34 situated in a top-bottom arrangement, it is to be understood that the rollers 32, 34 may be placed in a side-by-side arrangement in which arrangement, the top roller 32 becomes the first roller the sheet contacts while the bottom roller 34 becomes the second roller the sheet contacts.

A method for producing oriented strap S includes the steps of forming, as by extrusion, a sheet W and conveying the sheet W to the entry bridle assembly 22 of a forming apparatus 10. The sheet W winds around the entry bridle rollers 24, 26, 28, 30 for proper alignment for feeding into the zero gap assembly 12. The sheet W then feeds between a high pressure pinch roller 40 and the top roller 32 of the zero gap assembly 12, feeding around the top of the top roller 32. In this manner, the sheet W is compressed, flattening the surface roughness of the sheet W, to preclude air from entering the zero gap assembly 12 with the sheet W, between the sheet W and the top roller 32. The sheet W is driven by the top roller 32 and the entry bridle rollers 24, 26, 28, 30 which are driven at the same lineal surface velocity.

As it traverses into and through the zero gap assembly 12, the sheet W travels around the circumference of the top roller 32 until it reaches the work roller nip 36 defined between the top and bottom work rollers 32, 34. The faster rotating bottom roller 34 pulls the sheet W through the nip 36 while the slower rotating top roller 32 and the mill reduction brakes the speed of the lower surface of the sheet W. Thus, the sheet W accelerates through the nip 36 and is simultaneously milled and stretched to its final predetermined thickness as it passes through the nip 36.

The sheet W is worked, e.g., milled and stretched between a flat top roller 32 and a concave bottom roller 34. This tends to work the edges of the sheet W to a greater extent than the central region of the sheet W, which results in forming a sheet W having edges with a more consistent thickness (relative to the central region of the sheet W).

As it exits the zero gap assembly 12, i.e., following milling and stretching, the sheet S passes over a chill roller 60. The chill roller 60 reduces the temperature of the sheet S as it exits the assembly 12, and thus stops or at the least retards continued elongation of the sheet S. The sheet S is pulled from the assembly 12 (over the chill roller 60), by the exit bridle assembly 16. Pulling the now cooled sheet S produces a thin, flat, oriented sheet S that is ready to be surface treated and/or heat treated as desired and sliced into thin straps as required for use in strapping packages and the like in accordance with known procedures.

The above described apparatus and method produce a high quality, consistent thickness strap compared to known apparatuses and methods.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover all such modifications as fall within the scope of the claims.

What is claimed is:

1. A method of producing a plastic strap, comprising:
   providing first and second work rollers such that the work rollers rotate in opposite directions and at different lineal surface velocities, and wherein the work rollers are spaced apart with respect to each other so as to define a work roller nip therebetween;
   deaerating a solid sheet of material by providing a pinch roller operably associated with the first work roller, the pinch roller located approximately upstream of the first work roller, the pinch roller and the first roller defining a deaerating nip therebetween;
   feeding the solid sheet of material, having a thickness into the deaerating nip such that the solid sheet of material is pinched against the first work roller and moves with rotation of the first work roller to the work roller nip between the first and second work rollers to simultaneously mill and stretch the solid sheet of material substantially at the nip during a single pass of the solid sheet material through the nip as the rollers rotate in opposite directions and at different lineal surface velocities to form a milled and stretched oriented sheet;
   providing controlled and variable pressure to the solid sheet of material at the nip; and
   cooling the milled and stretched oriented sheet immediately following exit of the milled and stretched oriented sheet from the second work roller.

2. The method in accordance with claim 1, including the step of rotating the pinch roller at a speed to match the lineal surface velocity of the pinch roller with the lineal surface velocity of the first work roller.

3. The method in accordance with claim 1 including the step of compressing the solid sheet of material between the pinch roller and the first work roller.

4. The method in accordance with claim 1 wherein the second work roller has a concave profile having a smaller diameter in a central region than at opposing end regions, and wherein the solid sheet material is milled and stretched more at the opposing ends than at the central region.

5. The method in accordance with claim 1 including contacting the milled and stretched oriented sheet with a chill roller to cool the milled and stretched oriented sheet.

6. The method in accordance with claim 1 including the step of controlling a pressure exerted by the pinch roller at the deaerating nip.

7. The method in accordance with claim 1 wherein the pinch roller has a concave profile having a smaller diameter in a central region than at opposing end regions.

8. The method in accordance with claim 1 wherein the pinch roller has a convex profile having a larger diameter in a central region than at opposing end regions.

9. An apparatus for producing a plastic strap from a solid sheet of material, the apparatus comprising:
   first and second spaced apart work rollers defining a work roller nip therebetween, the first and second rollers rotating in opposite directions and at different lineal surface velocities, the work rollers being spaced apart to define a work roller nip therebetween;
   a pinch roller operably associated with the first work roller, the pinch roller located approximately upstream of the first work roller, the pinch roller and the first roller defining a deaerating nip therebetween wherein the strap is substantially deaerated, a cylinder operably connected to the pinch roller and configured to provide controlled and variable pressure to the strap as it is fed through the nip,
   wherein the solid sheet of material is fed into the deaerating nip and is pinched against the first work roller and moves with rotation of the first work roller to the work roller nip between the first and second work rollers to simultaneously mill and stretch the solid sheet of material substantially at the nip during a single pass of the solid sheet material through the nip as the rollers rotate to form a milled and stretched oriented sheet; and
   cooling the milled and stretched oriented sheet immediately following exit of the milled and stretched oriented sheet from the second work roller.

10. The apparatus in accordance with claim 9 wherein the second work roller has a concave profile having a smaller diameter in a central region than at opposing end regions such that the solid sheet material is milled and stretched more at the opposing ends than at the central region.

11. The apparatus in accordance with claim 9 including means for driving the pinch roller at a lineal surface velocity about equal to the lineal surface velocity of the first work roller.

12. The apparatus in accordance with claim 9 including means for cooling the milled and stretched oriented sheet following exit from the first and second work rollers.

13. The apparatus in accordance with claim 12 wherein the means for cooling includes a chill roller.

14. The apparatus in accordance with claim 13 wherein the chill roller is positioned immediate downstream of the second work roller.

15. The apparatus in accordance with claim 9 wherein the pinch roller has a concave profile having a smaller diameter in a central region than at opposing end regions.

16. The apparatus in accordance with claim 9 wherein the pinch roller has a convex profile having a larger diameter in a central region than at opposing end regions.

* * * * *